Nov. 14, 1961    W. HÄNDLER ET AL    3,008,638
ARRANGEMENT FOR CONVERTING DECIMAL NUMBERS
INTO BINARY NUMBERS OR VICE VERSA
Filed March 18, 1958    6 Sheets-Sheet 1

Inventors
WOLFGANG HÄNDLER and
HANS-OTTO LEILICH

By: Eric D. Frankel
PATENT AGENT

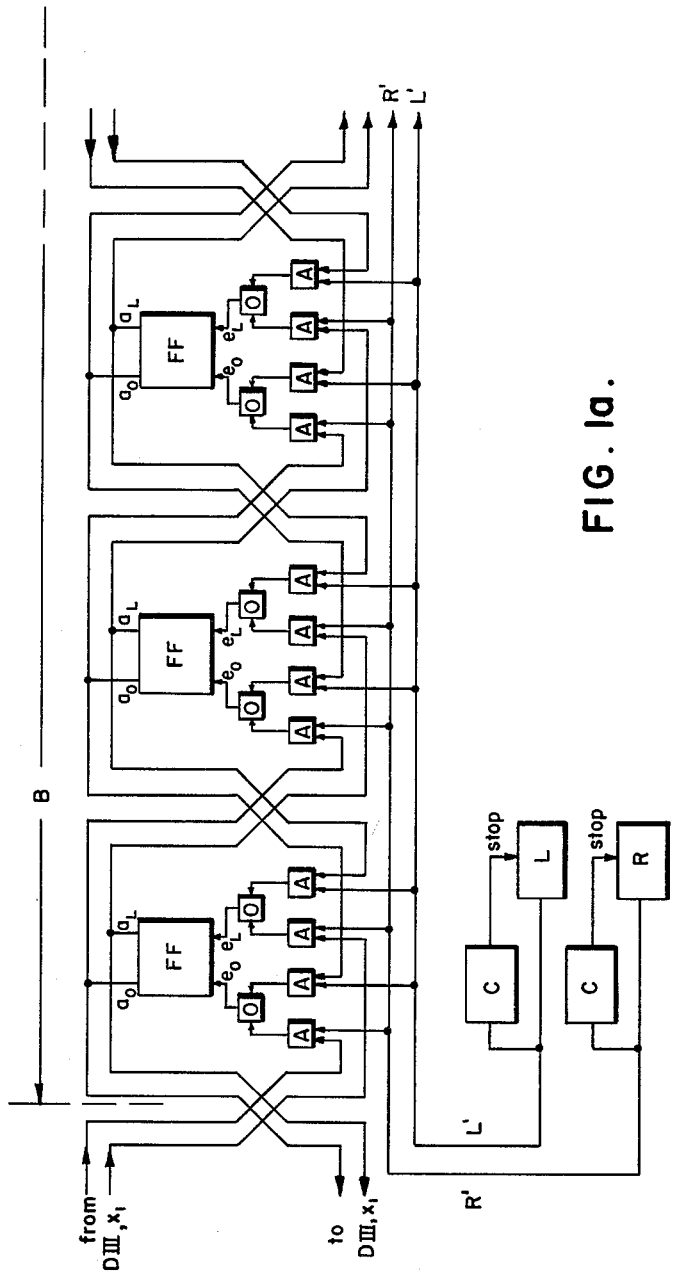

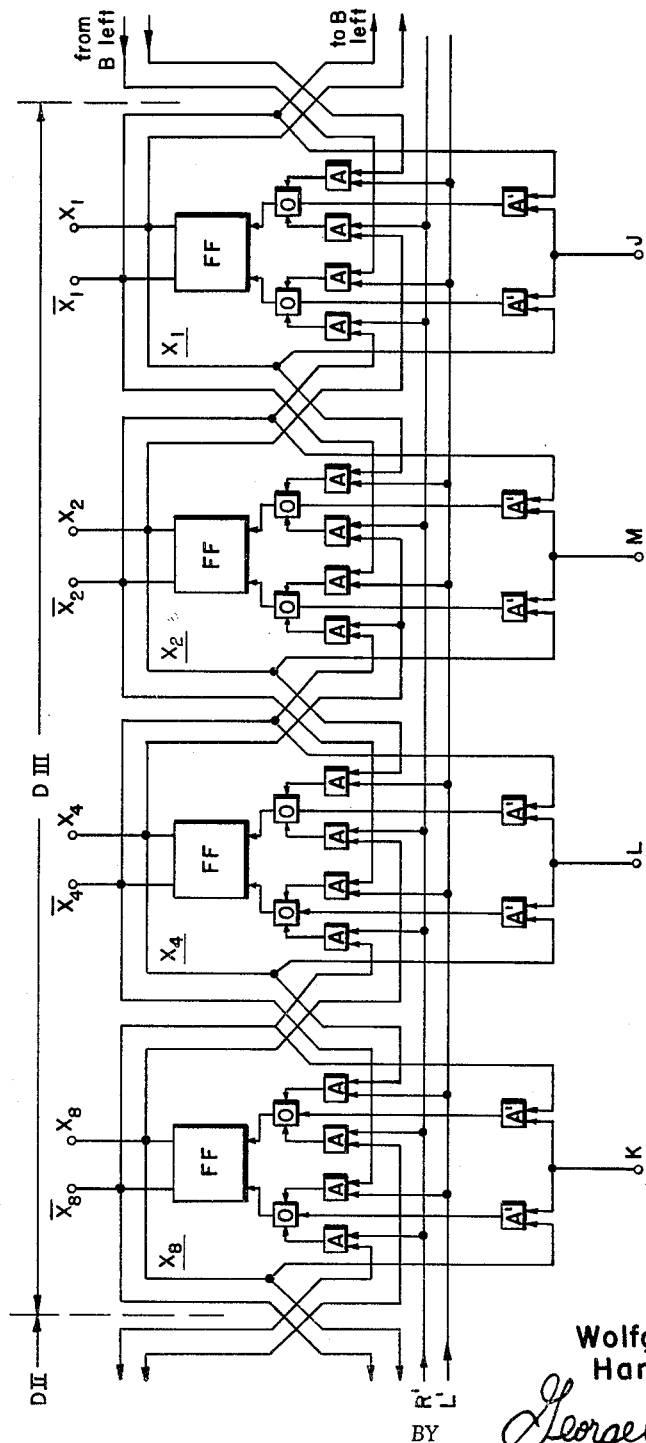

United States Patent Office 3,008,638
Patented Nov. 14, 1961

3,008,638
ARRANGEMENT FOR CONVERTING DECIMAL NUMBERS INTO BINARY NUMBERS OR VICE VERSA
Wolfgang Händler and Hans-Otto Leilich, Backnang, Germany, assignors to Telefunken G.m.b.H., Berlin, Germany
Filed Mar. 18, 1958, Ser. No. 722,209
Claims priority, application Germany Mar. 20, 1957
3 Claims. (Cl. 235—155)

This invention relates to an arrangement for converting decimal numbers into binary numbers or vice versa, more particularly for use in electronic computers and similar programme-controlled units. Computers and other apparatus operating in purely binary system require number conversion from and into the decimal system at the input and output, respectively, of the quantities involved in the calculating process. For this purpose various algorithms or calculating methods are known, according to which a computer is provided with a separate control unit which introduces the necessary calculating steps in the correct succession; alternately, there are provided in the computer iterative sub-programmes which contain, say, 60 orders or more, in order to call up in proper succession the elementaary operations corresponding to the calculating specification of the respective algorithm. Both methods have the disadvantage that the whole computer must be used for conversion purposes so that the apparatus cannot perform any other calculating operation during the conversion time. Furthermore it is necessary either to spend a considerable amount of money on control units, or to reserve a large portion of the store means for the sub-programme required, said portion being thus no longer available for the actual calculating work. Also, algorithms used for conversion in a purely binary apparatus are rather complicated and therefore require a large number of operations so that a considerable time has to be added to the actual calculating time.

It is an object of this invention to provide a new and improved apparatus for converting numerical information from one radix to another.

It is another object of this invention to provide a new and improved apparatus for the conversion of numerical information from decimal to binary notation.

It is a further object of this invention to provide a new and improved apparatus for converting numerical information from binary to decimal notation.

Other objects and advantages of this invention will become more apparent as the following description proceeds, which description should be considered together with the accompanying drawings, in which:

FIGURE 1a shows the left end of a portion of the shift register of FIGURE 1, this portion being hereinafter identified as B;

FIGURE 1c shows a tetrad of the register portion D, particularly the tetrad at the right end of the register;

Figure 1:
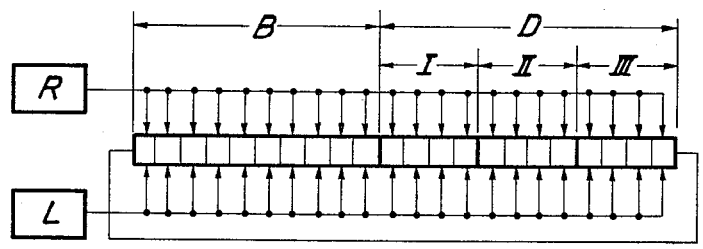
FIGURE 1 illustrates, in block form, a shift register used in the system of this invention.

The invention utilises a particularly simple algorithm which was already known but has never been used heretofore in a purely binary apparatus for conversion purpose, because it was not considered suitable (see Booth and Booth, "Automatic Digital Calculators," London, 1956, page 190 bottom). Application of this algorithm according to the invention requires only relatively simple connecting networks, very little expense on control means and no participation of the store capacity of the computer. Except for the aforementioned connecting networks the various calculating operations require a shift register only, so that it is possible to perform a conversion without utilising the whole apparatus; the invention is particularly advantageous when it is necessary to perform a conversion and a whole computer is not available.

The simple algorithm used will first be described briefly hereafter. A proper decimal fraction of the form $$D = \sum_{1}^{N} d_{-k} \cdot 10^{-k} \quad (d_{-k} = 0, 1, 2, 3 \ldots 9)$$

is converted into a binary fraction of the form $$B = \sum_{1}^{M} b_{-i} \cdot 2^{-i} \quad (b_{-i} = 0, L) \quad (L = \text{binary one})$$

by successively multiplying by 2. After the first multiplication, the first digit (carry over) before the decimal point indicates whether the factor $\frac{1}{2} = 2^{-1}$ is present or not in the binary fraction. After the second multiplication, said first digit is shifted by one position toward left while a zero or a one appears now directly before the decimal point. This last-mentioned digit indicates in a similar way whether the factor $\frac{1}{4} = 2^{-2}$ is present or not in the newly-formed binary fraction. Step by step the whole binary number can thus appear on the left of the decimal point. In this process, the left-hand portion of the number (integer) must be repeatedly multiplied by 2 in the binary code (which means, shifted by one position to the left) while the right-hand portion (fraction) must be multiplied by 2 in the decimal code.

We have:

$$D.2 = (b_{-1}.2^{-1}).2 + \sum_{1}^{N} d'_{-k}.10^{-k}$$

$$D.2.2 = (b_{-1}.2^{-1} + b_{-2}.2^{-2}).2.2 + \sum_{1}^{N} d''_{-k}.10^{-k}$$

etc., and generally $$D.2^n = (b_{-1}.2^{-1} + b_{-2}.2^{-2} + \ldots b_{-n}.2^{-n}).2^n$$

$$+ \sum_{1}^{N} d_{-k}^{(n)}.10^{-k}$$

The resulting binary number is shifted every time by $n$ digits towards left before the virtual decimal point, while the digits $d'_{-k}$, $d''_{-k}$, etc. are obtained by multiplying the number by 2 according to the arithmetic laws. The process is stopped when the binary number is equal to the decimal number with sufficient accuracy. There is finally obtained:

$$D.2^M = \left( \sum_{1}^{M} b_{-n}.2^{-n} \right).2^M + \text{remainder}$$

M is to be determined in a suitable manner in accordance with N. Both representations of the number have about the same relative accuracy when $2^M \approx 10^N$.

For illustrative purpose it is shown therebelow how the proper decimal fraction 0.413 is converted step by step into a binary fraction:

TABLE 1

| | |
|---|---|
| 0. | 0.413 |
| 0.0 | 0.826 |
| 0.0L ← | 1.652 |
| 0.0LL ← | 1.304 |
| 0.0LL0 | 0.608 |
| 0.0LL0L ← | 1.216 |
| 0.0LL0L0 | 0.432 |
| 0.0LL0L00 | 0.864 |
| 0.0LL0L00L ← | 1.728 |
| 0.0LL0L00LL ← | 1.456 |
| 0.0LL0L00LL0 | 0.912 |

Each arrow indicated occurrence of a decimal one which is transferred as a binary one (L) to the left-hand side. It will be appreciated that the process could be continued to infinity; for the afore-mentioned reasons it is however suitable to stop it at $M=10$ ($2^{10} \approx 10^3$).

In a similar manner, decimal integers are converted through gradual division by 2. For illustrative purpose there is shown hereafter conversion of the decimal integer 413 into a binary number:

TABLE 2

| 413 | | | |
|---|---|---|---|
| 206 | remainder 1 | → | L |
| 103 | remainder 0 | | 0L |
| 51 | remainder 1 | → | L0L |
| 25 | remainder 1 | → | LL0L |
| 12 | remainder 1 | → | LLL0L |
| 6 | remainder 0 | | 0LLL0L |
| 3 | remainder 0 | | 00LLL0L |
| 1 | remainder 1 | → | L00LLL0L |
| 0 | remainder 1 | → | LL00LLL0L |

For application of the above-described algorithm there is provided an arrangement for converting decimal numbers into binary numbers or vice versa, which includes a two-section shift register, the first section thereof being used for reception of the decimal number in binary (e.g. tetrad) coded form for each decimal position, while the second section thereof is used for reception of the binary number. Moreover there is provided a device which shifts the number contained in one of said sections step by step into the other section, this being done by gradual multiplication by 2 (left shift) or division by 2 (right shift). Furthermore there is provided a decision network for checking the decimal section of the register, between any two one-digit shifts, on the occurrence of pseudotetrads or, possibly, carries over, and performing corresponding corrections on the respective tetrads. For converting a proper fraction, the right-hand section of the register may be used for reception of the decimal fraction coded in tetrads and the left-hand section for reception of the binary fraction, so that in converting a decimal fraction into a binary fraction, the latter is formed by the overflows of the tetrad representing the tenths of the decimal number, said overflows appearing on gradually multiplying by 2 (left shift). For converting an integer, the left-hand section of the register may be used for reception of the tetrad-coded decimal number and the right-hand section, for reception of the binary number, so that during the conversion process of a decimal number into a binary number, the latter is formed by the remainders of the tetrad representing the unities, said remainders being transferred into the binary section on gradually dividing by 2 (right shift).

To make the description clearer, reference will be made hereafter to a "left-hand" and a "right-hand" register section, B and D respectively, this however implying no limitation. Each section of the register contains a series of digits, the left-hand section has a series of M binary positions and the right-hand section, a series of N decimal positions each consisting of four binary positions, according to the relationship $2^M \approx 10^N$. The sections may also be formed as two separate registers connected in any suitable manner, for example by means of a ring-shaped coupling.

In practice, the same register section will be used for decimal numbers and for binary numbers respectively, both when dealing with proper fractions and when dealing with integers. If, for example, the right-hand section of the register is always used for decimal numbers, care must be taken, when converting integers, that the right-hand end of the register should be connected to the left-hand end thereof so as to allow for the remainders of the division by 2 leaving the right-hand end to feed the binary section through the left-hand end thereof and for the overflows of the multiplication by 2 leaving the left-hand end to enter the decimal section again through the right-hand end thereof.

FIG. 1 illustrates diagrammatically such a register comprising a binary section B and a decimal section D. The latter consists of $N=3$ tetrads = 12 positions, the binary section of $M=10$ positions. Each position of the register may be represented in known manner by a flip-flop circuit, such as those disclosed in "A Transistor Reversible Binary Counter," by Robert E. Trent, in National Electronic Conference Proceedings, volume 8, 1952, on pp. 346–357; and also in "A Variable Binary Scaler," by D. B. Murray, in I.R.E. Transactions, EC–4, of June 1955. These flip-flop circuits are interconnected to form a shift register so that a pulse coming from the pulse source R causes the register contents to be shifted by one position to the right, while a pulse coming from the pulse source L causes said contents to be shifted by one binary position to the left. Moreover the flip-flop circuits in the decimal section are provided with input terminals (not shown in FIG. 1) which enable them to perform a "change over" in each individual flip-flop. The purpose of this arrangement is explained hereafter with reference to FIG. 2. The flip-flop circuits referred to in the specification are by no means intended to limit the invention. Any other static or dynamic bistable register element is suitable for the operations described herein. To simplify the description, the operation "change over" is also assumed in connection with the use of flip-flop circuits with other elements. The operations "set" and "clear" may replace the "change over."

Performance of the register will be illustrated by means of Table 3 which shows how the algorithm is used for converting a proper decimal fraction into a binary fraction as in Table 1, with application of the direct tetrad coding. Here again, there is denoted by B the left-hand section of the register where the binary fraction is built up gradually by left-shift, and by I, II and III the right-hand section D of the register where the tenths, hundredths and thousandths of the decimal fraction 0.413 respectively are set in tetrad coding at the beginning of the operation.

TABLE 3

| Step | Part | | B | I | II | III | Dec. |
|---|---|---|---|---|---|---|---|
| 1 | a | Shifting corr: none. | .0 | 0L00 L000 | 000L 00L0 | 00LL 0LL0 | .413 |
| | b | | .0 | L000 0000 | 00L0 0L00 | 0LL0 LL00 | .826 |
| 2 | a | Shifting co: I and III. | .0L | 0LL0 WW | 0L0L W | 00L0 WWW | .652 |
| | b | | .0L | 0LL0 | 0L0L | 00L0 | |
| 3 | a | Shifting co: I and II. | .0L0 W | LL00 WWWW | L0L0 W W | 0L00 | |
| | b | | .0LL | 00LL | 0000 | 0L00 | .304 |
| 4 | a | Shifting corr: none. | .0LL0 | 0LL0 | 0000 | L000 | |
| | b | | .0LL0 | 0LL0 | 0000 | L000 | .608 |
| 5 | a | Shifting co: II and III. | .0LL00 W | LL00 WWW | 000L | 0000 WW | |
| | b | | .0LL0L | 00L0 | 000L | 0LL0 | .216 |
| 6 | a | Shifting corr: III. | .0LL0L0 | 0L00 | 00L0 W | 0LL0 WWW | |
| | b | | .0LL0L0 | 0L00 | 00LL | 00L0 | .432 |
| 7 | a | Shifting corr: none. | .0LL0L00 | L000 | 0LL0 | 0L00 | |
| | b | | .0LL0L00L | 0000 WW | LL00 WWWW | L000 | .864 |
| 8 | a | Shifting co: I and II. | .0LL0L00L | 0LLL W | 00L0 | L000 | .728 |
| | b | | .0LL0L00L0 | LLL0 W | 0L0L W | 0000 WW | |
| 9 | a | Shifting co: I and III. | .0LL0L00LL | 0L00 | 0L0L | 0LL0 | .456 |
| | b | | | | | | |
| 10 | a | Shifting | .0LL0L00LL0 | L000 | L0L0 | LL00 | |

Each step 1, 2, 3 . . . consists of two parts *a* and *b;* a shift of one position toward left occurs during the first part, *a*, and a check on the occurrence of pseudo-tetrads or carries over from one tetrad to the next one, as well as a corresponding correction, are performed during the second part, *b*. Pseudo-tetrads and carries over occur when, before the shift, a tetrad contained a decimal digit $\geq 5$. Therefore, no correction is required after the first shift toward left (step 1*a*) and the right-hand section of the register contains 0.826. After the second shift toward left (step 2*a*), a L is transferred into the section B and the pseudo-decimal LL00 appears in the tetrad III. Tetrads I and III must be corrected by adding the amount 6=0LL0 (step 2*b*) to each of them producing changes in those binary digits below which "W" appears in Table 3, so that the number 0.652 appears now in tetrad-coding in the right-hand section of the register. The carry from tetrad III produces a change in one binary digit of tetrad II, as shown in the table. After the third shift (step 3*a*), 0L0 appears in the binary section B. Because of the pseudo-decimals, a correction is necessary in the tetrads I and II (step 3*b*), and so on. At the end of the process, the M-position binary number appears in the left-hand section of the register, while the decimal remainder remains in the right-hand section. This process will be carried on until said remainder can no longer yield any effective digit for the binary number, though it still includes three decimal numbers according to the relationship $2^M \approx 10^N$. To be sure to stop the process at the right moment, there is provided a counter unit (not shown in the drawing) having a capacity equal in number to the M number of positions of the binary section B. This counter, after M shifting steps, produces a signal which suppresses the further generation of shifting impulses from the impulse source L or R, as the case may be. This also ensures the correct positioning of the decimal point after conversion.

Reverse conversion of a binary fraction into a decimal fraction may also be performed in a corresponding manner, succession of both step parts *a* and *b* being interchanged and shifts toward right replacing shifts toward left (division by 2). The binary number is thus contained in section B and a determination is first made whether in one of the positions in which the shifting had occurred (this can, at first, be only the least significant binary position) there is a L, and the number 0LL0=6 is subtracted in the corresponding adjacent right-hand tetrads. The number is then shifted to the left by one binary digit, is again tested, and, if necessary, corrected as explained above.

Table 3*a* illustrates a numerical example (0.LL0L= 0.8125) of the above:

TABLE 3*a*

| STEP | PART | | B | D | | |
|---|---|---|---|---|---|---|
| | | | | I | II | III |
| | | | L L 0 L 0 0 0 0 0 | | | |
| 1 | a | corr: none | | | | |
| | b | Shifting | L L 0 L 0 0 0 0 | 0 | | |
| 2 | a | corr: none | | | | |
| | b | Shifting | L L 0 L 0 0 0 | 0 0 | | |
| 3 | a | corr: none | | | | |
| | b | Shifting | L L 0 L 0 0 | 0 0 0 | | |
| 4 | a | corr: none | | | | |
| | b | Shifting | L L 0 L 0 | 0 0 0 0 | | |
| 5 | a | corr: none | | | | |
| | b | Shifting | L L 0 L | 0 0 0 0 | 0 | |
| 6 | a | corr: none | | | | |
| | b | Shifting | L L 0 L | 0 0 0 0 | 0 0 | |
| 7 | a | corr: I | | − 0 L L 0 | | |
| | b | Shifting | L L 0 0<br>L L 0 | L 0 L 0<br>0 L 0 L | 0 0<br>0 0 0 | |
| 8 | a | corr: II | | | − 0 L L 0 | |
| | b | Shifting | L L 0<br>L L | 0 L 0 0<br>0 0 L 0 | L 0 L 0<br>0 L 0 L | 0 0 0 0 |
| 9 | a | corr: I and III | | − 0 L L 0 | | − 0 L L 0 |
| | b | Shifting | L 0<br>L | L L 0 0<br>0 L L 0 | 0 L 0 0<br>0 0 L 0 | L 0 L 0<br>0 L 0 L |
| 10 | a | corr: I | | − 0 L L 0 | | |
| | b | Shifting | L | 0 0 0 0<br>L 0 0 0 | 0 0 L 0<br>0 0 0 L | 0 L 0 L<br>0 0 L 0 (L) |
| | | | | 8 | 1 | 2 (5) |

The aforementioned corrections which comprise the addition of 0LL0 are effected according to the invention by means of a decision network. The correction depends upon the shift direction of the algorithm considered. In the case of a shift toward left, which occurs when a proper decimal fraction is converted into a binary fraction, or a binary integer into a decimal number, a correction in multiplication by 2 is only required when one of the numbers 5, 6, 7, 8 or 9 appears previously in the tetrad. If the tetrad contains the numbers 0, 1, 2, 3 or 4 before the shift, no correction is required. In the direct tetrad coding, which is given herein by way of example, the new tetrad contains after the shift either the double value 2, 4, 6 or 8, or the value 3, 5, 7 or 9 in the case where a carry over from the next-lower tetrad (right adjacent tetrad) is to be added. It is different in the case where the tetrad contained one of the numbers 5, 6, 7, 8 or 9. A carry over must be effected on to the next tetrad (left adjacent tetrad) after each shift in the final result. A general survey appears in the following table:

TABLE 4

| 1 | | 5 | | 6 | | 7 | | 8 | | 9 |
|---|---|------|---|------|---|------|---|------|---|------|
| 2 | | 0L0L | | 0LL0 | | 0LLL | L | L000 | L | L00L |
| 3 | 0 | L0L— | 0 | LL0— | 0 | LLL— | L | 000— | L | 00L— |
| 4 | L | 000— | L | 00L— | L | 0L0— | L | 0LL— | L | L00— |
| 5 | W | W W  | W | WWW  | W | W W  |   | WW   |   | W W  |

The corresponding decimal numbers are in the first line. The corresponding tetrad in direct coding (with the values 8, 4, 2, 1) is in the second line. The third line shows the tetrad after a shift by one position toward left (multiplication by 2). This causes the first digit of each tetrad to be carried over as a unity into the next higher tetrad. In the fourth line there are shown the corrected digit values. In the fifth line the letter W indicates in which binary position a "change over" has taken place. This letter W appears also in Table 3 at every step between parts $a$ and parts $b$ and indicates a "change over."

If the various flip-flops of a tetrad are denoted by $x_8$, $x_4$, $x_2$, $x_1$ according to their binary position values, and the flip-flop corresponding to the unity of the next (left) tetrad into which a carry over may be transferred is denoted by $x_u$, it will be seen that the position $x_1$ of said tetrad is unimportant for the correction to be performed. But, on correcting, the position $x_u$ ($x_1$ of the next tetrad, left) must be considered together with the positions $x_8$, $x_4$ and $x_2$. A decision circuit performing the corrections indicated in the previous tables must therefore effect a change over in some positions $x_k$ ($k=2, 4, 8, u$) in other words, convert a one into a zero or a zero into a one, depending on whether a zero or a one is set in some other positions $x_i$ ($i=2, 4, 8, u$). For the numbers 5, 6, 7, 8 and 9 (before the shift) there can be found particular rules which are given in Table 5, lines A to D. $X_1$ denotes the condition of the register when the respective digit $x_1$ is one (L) and $\overline{X}_1$, the condition of the register when said digit is a zero (0). Corresponding relationships are obtained when converting a binary fraction into a decimal fraction, the correction being performed in the first part of each step and the shift toward right in the second part of each step. The relationships prevailing herein are given in Table 5, lines E to H. The decimal numbers appearing in the respective tetrad before (A to D) and after (E to H) the shift are given in the last column:

TABLE 5

A, if $X_8$ & $X_2$, then change over $x_u, x_8, x_2$    (5 and 7)
B, if $X_8$ & $X_4$ & $\overline{X}_2$, then change over $x_u, x_8, x_4, x_2$ (6)
C, if $X_u$ & $\overline{X}_2$, then change over $x_4, x_2$    (8)
D, if $X_u$ & $X_2$, then change over $x_8, x_2$    (9)
E, if $X_u$ & $\overline{X}_8$ & $\overline{X}_2$, then change over $x_u, x_8, x_2$ (5 and 7)
F, if $X_u$ & $\overline{X}_4$ & $X_2$, then change over
                       $x_u, x_8, x_4, x_2$ (6)
G, if $X_u$ & $X_4$ & $X_2$, then change over $x_4, x_2$    (8)
H, if $X_u$ & $X_8$, then change over $x_8, x_2$    (9)

It can be seen that in the case where a 5 or a 7 appears in the tetrad before the shift, the same relationship is valid.

Figure 2:
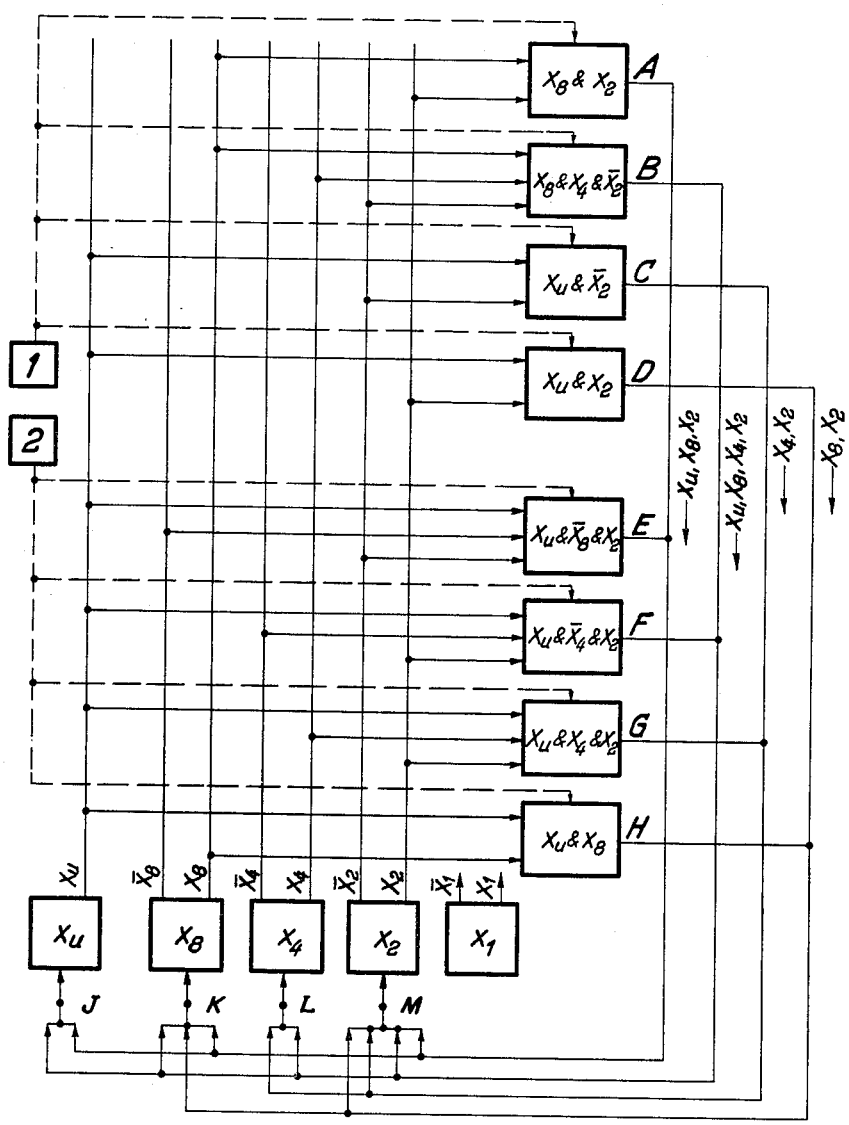
FIGURE 2 illustrates, in block form, a correcting network according to the principles of this invention.

A correcting network performing the corrections indicated above is represented diagrammatically for one tetrad in FIG. 2. The various positions of the tetrad which may be represented by flip-flop circuits are denoted by $x_1, x_2, x_4, x_8$ and $x_u, x_u$ belonging to the next higher tetrad of the register where it forms the digit $x_1$. Each flip-flop has two output conductors, one of them, $X_1$, carrying voltage when the condition $L(X_1)$ prevails, the other carrying voltage when the condition $0(\overline{X}_1)$ prevails except for $x_u$ which has output conductor $L(X_1)$ only. In accordance with the operations derived from the above table, these output conductors lead to "and-gate circuits" A ... D and E ... H, which can be designed in known manner as relay, tube, transistor, ring core or diode circuits. Some typical gate circuits are shown in "High-Speed Computing Devices," by the Staff of Engineering Research Associates, Inc., published by McGraw-Hill Book Co., in 1950, pp. 37–45. Every such gate has an input for correction pulses supplied by the source 1 for the gates A ... D and by the source 2 for the gates E ... H. When a shift toward left (multiplication by 2) is preformed in the first time of a step, a pulse from the correction pulse control source 1 is fed to the gates A ... D in the second time of said step. When a shift toward right (division by 2) is performed, a pulse from the source 2 is fed to the gates E ... H. The outputs of gates A ... H are connected to the corresponding control inputs J, K, L, M of the flip-flops $x_1$ according to the aforementioned relationships A ... H, in such a manner that a change over occurs in the right flip-flops. It will be appreciated that such a circuit embodies the aforementioned connections A ... H.

Figure 1B:
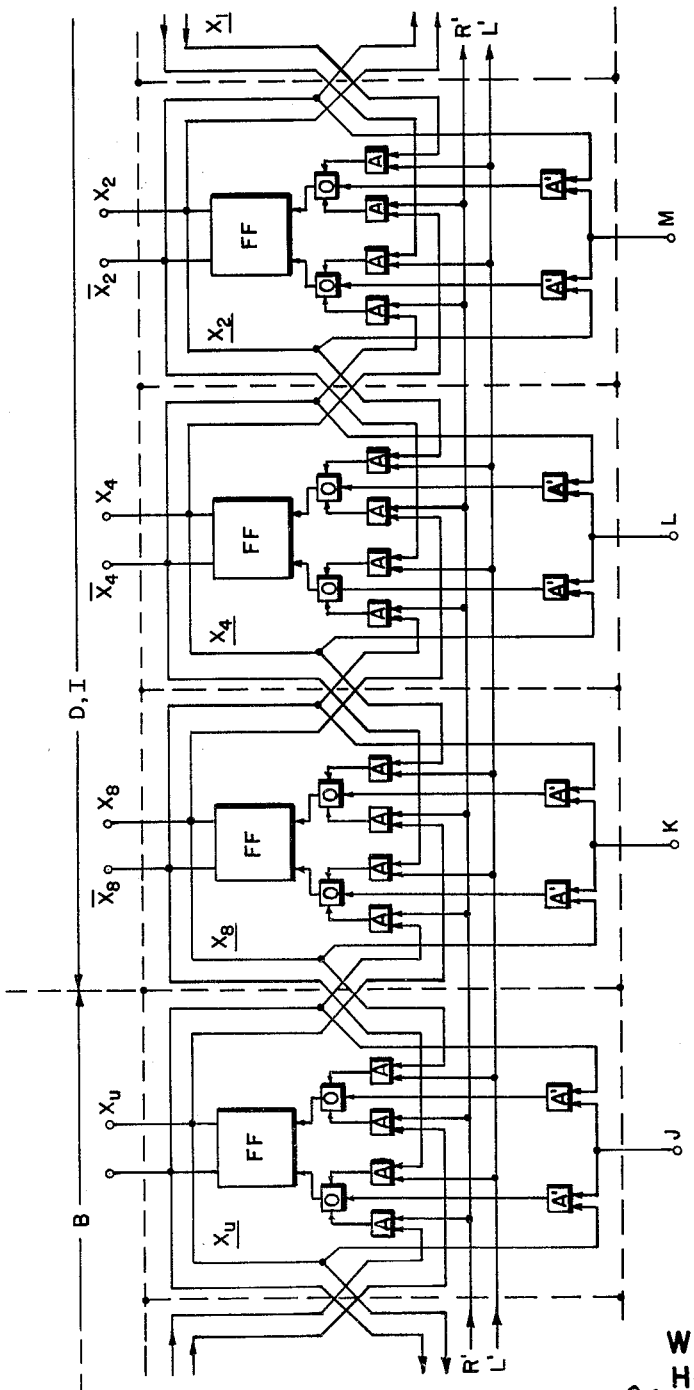
FIGURE 1b shows the middle portion of the shifting register, including the transition of the portion B to a portion hereinafter identified as D.

Referring now to FIGURES 1a, 1b, and 1c, FF show the flip-flops of the individual register elements. Each flip-flop has two inputs $e_0$ and $e_L$ and two outputs $a_0$ and $a_L$ for the zero (0) and one (L) bits of information. The elements are, in a known manner, so interconnected by a network made up of AND-circuits A and OR-circuits 0, that when an impulse arrives at the line L', the information is shifted leftwardly by one element, and when an impulse arrives at the line R', the information is shifted rightwardly by one element. As shown in FIGURE 1a, the lines L' and R' are connected with the impulse source L and R, respectively (FIGURE 1). Furthermore, the lines L' and R' are each connected to an impulse counter C which, by transmitting a stop command, turns off the respective impulse source after N steps.

FIGURE 1b additionally shows the connections J, K, L, M, of the output lines of a correcting network according to FIGURE 1 to the inputs of the flip-flops of the first tetrad I via additional AND-circuits A', as well as the above-mentioned OR-circuits 0. When an impulse is applied to one of these lines, the corresponding flip-flop will change its position, i.e., zero becomes one and one becomes zero. Also shown are the outputs $X_u$, $X_8$, $\overline{X}_8$, $X_4$, $\overline{X}_4$, $X_2$, $\overline{X}_2$, which act as inputs for the correcting network illustrated in FIGURE 2.

Other embodiments of registers according to the invention can also be carried out, wherein the process which requires two parts to each step in the aforementioned example can be effected in one part only. In such a case, however, it is generally necessary to "set" and "clear" the flip-flops representing various digits of the register, instead of using a "change over" as in the above described example. Other methods of coding the decimal numbers require obviously other correcting networks, the function of which is determined by the special method involved.

It will be appreciated that a shift register of the aforedescribed type can be used to perform the following conversions:

(a) *Conversion of proper decimal fractions into binary fractions and vice versa*

First, the decimal number in direct tetrad coding is located in the right-hand section of the register. The decimal point lies virtually between the two halves of the register. The number is gradually transferred to the left-hand section in the above-mentioned manner and thereby converted into a binary number. The number of steps is preferably equal to the binary capacity of the left-hand section. To convert proper binary fractions into decimal fractions the process is carried out in the reverse direction.

(b) *Conversion of decimal integers into binary numbers and vice versa*

First, the number in direct tetrad coding is located in the right-hand section of the register. The decimal point lies virtually on the right, at the end of the right-hand section. Said end is coupled to the left-hand end of the left-hand section. During the conversion process the number is derived gradually from the register on the right thereof and fed again to the left-hand section from the left. The number of steps should here also be equal to the binary capacity of the left-hand section of the register, so that at the end of the conversion process the number is located at the proper place in the left-hand section. To convert binary integers into decimal numbers the process is carried out in the reverse direction.

For every shift toward left (multiplication by 2) the corresponding correction pulse source 1 must be actuated, and reversely, for every shift toward right (division by 2) the corresponding correction pulse source 2 must be actuated. In the first case, shift is performed first, then correction; in the second case, operations are reversed.

According to a further embodiment of the invention the register shown diagrammatically in FIG. 1 can be so completed as to convert numbers in half-logarithmic representation (floating point representation) too, this enabling mixed numbers with an integer and a fractional part to be converted. For this purpose, additional counters for the exponents must be provided. In floating point representation, a decimal number appears as $D=d.10^p$, where $d$ is the decimal mantissa and $p$ the integer exponent of base 10. By selecting $p$ correspondingly, $|d|<1$ is ensured. A binary number B is represented in floating point representation as follows: $B=b.2^q$, where $b$ is the binary mantissa and $q$ the integer exponent of base 2.

Figure 3:
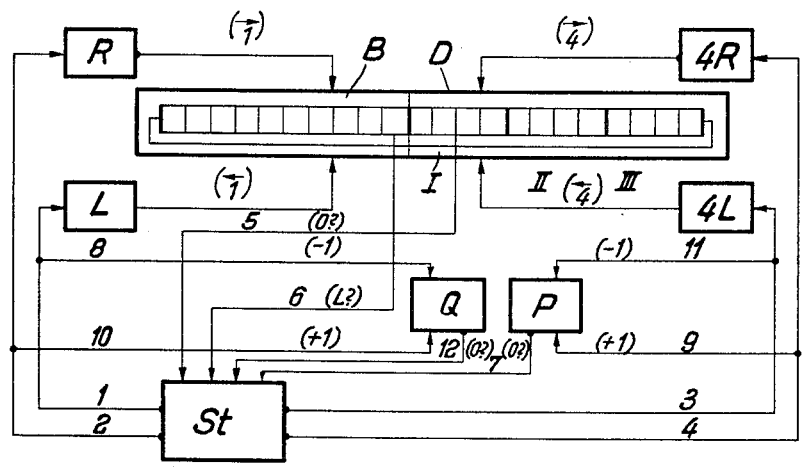
FIGURE 3 illustrates, in block form, a shift register and associated circuit elements for converting numbers with floating points from one radix to another.

FIG. 3 shows a register suitable for converting numbers in floating point representation. Counters P (for the decimal exponent $p$) and Q (for the binary exponent $q$) are added to the units B, D, R and L already described with reference to FIG. 1. Counters are discussed in substantial detail in "High-Speed Computing Devices," pp. 12–31. There are also added two further pulse sources 4R and 4L, through which the whole register contents can be shifted by four positions toward right or toward left. Such a shift results in a division or a multiplication by 10 respectively in the decimal section D of the register. The various pulse control sources R, L, 4R and 4L are controlled by a control unit St, in accordance with the algorithm to be disclosed hereafter with reference to a few examples. From the control unit St, control conductors 1, 2, 3, 4 lead to the various pulse sources L, R, 4L, 4R and read out conductor 6 leads to the first binary position of the register section B while read out conductor 6 is connected to the first tetrad of register D. A further read out conductor 7 leads to the counter P.

Operation of this arrangement will be explained separately for the case $p<0$ and for the case $p>0$.

In both cases, when the conversion process of a decimal number into a binary number starts, the decimal mantissa $d$ is located in the right-hand section D of the shift register, for example in direct tetrad coding, as already explained above. The exponent $p$ is in the decimal exponent counter P. The left-hand section B of the register is used once more to receive the binary mantissa $b$ which is built up step by step, while at the end of the conversion process, the counter Q will contain the binary exponent $q$.

Conversion is performed in two operative stages; in the first one, there is effected a normalisation which comprises breaking up the decimal exponent located in the counter P through simultaneous transformation of $d$ and transferring it as a binary exponent into the counter Q which is positioned at zero at the beginning of the normalisation process. This is done in a different manner, depending on whether $p<0$ or $p>0$, i.e., whether the number in the counter is positive or negative. In order to determine this, the most significant position can be used to represent the algebraic sign. Accordingly, such position can then not be used for positive numbers, i.e., the counter must have a number of positions which are greater by one than the number of digits of the largest number which is to be handled. If with such a counter one starts with the position zero and counts backwards one step, then in the case of a decimal counter, a series of nines will appear, whereas with a binary counter a series of ones will appear. The number 9, or 1, in the most significant position is thus indicative of the fact that a negative number is stored in the counter, this information being given in the so-called complementary form. Thus, the question of whether $p>0$ or $p<0$, can readily be determined at the counter P or Q by reading out the most significant position.

Figure 3A:
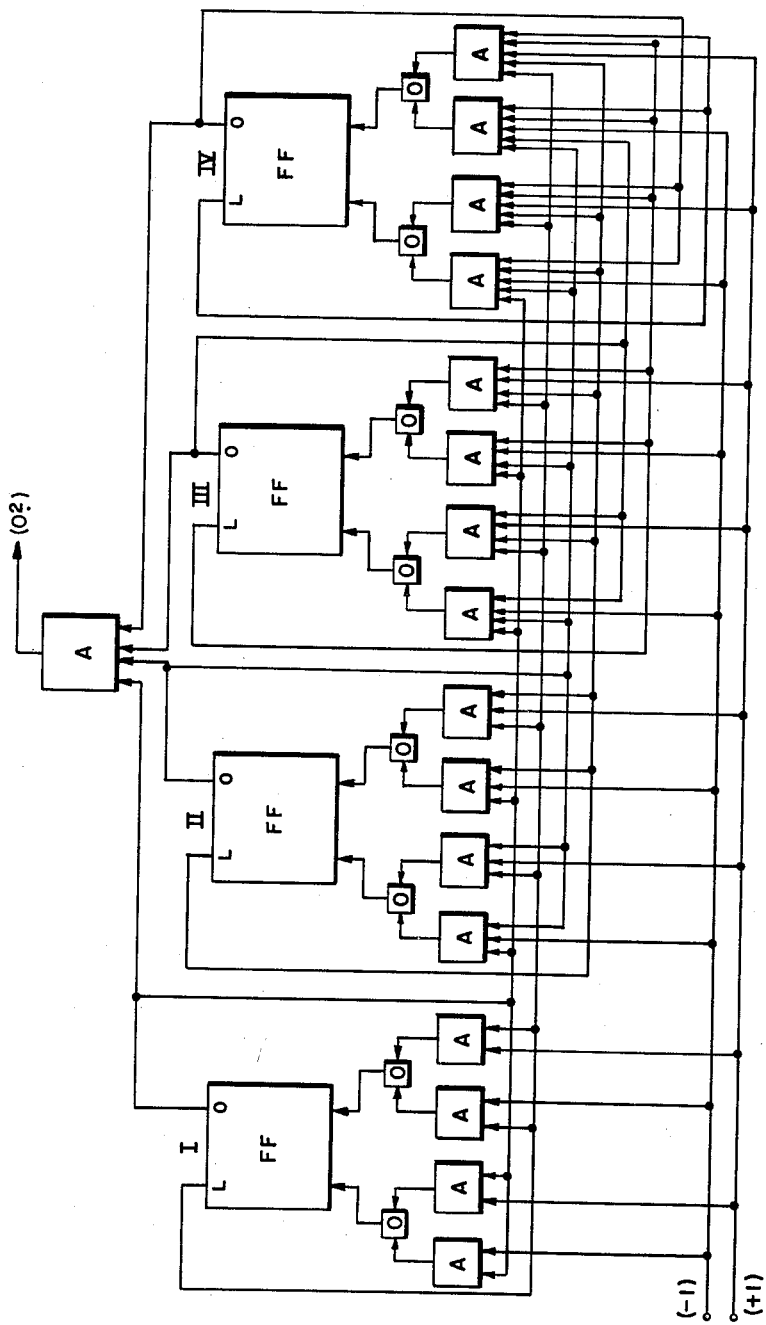
FIGURE 3a shows a binary counter, made up of conventional components, and having four binary positions.

In order to illustrate the above, reference is made to FIGURE 3a which is a binary counter having four binary positions I, II, III, IV, and which is made up of conventional AND-circuits A, OR-circuits 0, and flip-flops FF. This counter will count backward one step whenever an impulse is applied to the terminal (−1), and forward one step whenever an impulse is applied to the terminal (+1). If care is taken that the absolute value stored in the counter is never larger than $2^3-1=7$, the position IV will always be zero when a positive value is stored in the counter, and always be one when a negative value is stored, the positions I, II, and III then representing the stored number in its complementary form.

If $p<0$, the process starts with continuous multiplications by 2, in other words, with shifts by one position toward left followed by corrections of the pseudo-tetrads and carries over, the pulse source L being actuated via the control conductor 1. The number of these multiplications is fed to the counter Q via the conductor 8 and subtracted from zero in said unit. Whenever a pulse is applied to L to cause a left shift of the register, a pulse is also applied through line 8 to the counter Q to step the counter backward one count. As soon as on overflow occurs from the register section D into the register section B— this being reported to the control unit St by the read out conductor 6— the succession of multiplications by 2 is stopped and the pulse source 4R is actuated via the control conductor 4 and causes a shift by four positions toward right, namely a division by 10, to occur in the register. At the same time the negative exponent located in the counter P is increased by 1 via the conductor 9. Then, multiplications by 2 are resumed and the number in the counter Q is simultaneously decreased by 1 every time, till the next overflow occurs. This change over will go on until the exponent zero appears in the counter P. This condition is reported to the control unit St via the read out conductor 7 and said unit then initiates the second operative stage which is carried out exactly as already explained in details for conversion of ordinary decimal fractions with reference to Table 3. The final binary exponent $q$ is now to be found in the counter Q. After the M further multiplications by 2, the binary mantissa appears in the register section B and the binary exponent in the counter Q, and it will be noted in this respect that counters P and Q are no longer connected during the second operative stage. Table 6 shows an example of calculation for converting the decimal number 0.001, written in the form $0.1 \cdot 10^{-2}$ into a binary number:

TABLE 6

| B | D | Op | P | Q |
|---|---|---|---|---|
| 0000000000 | 0.100 |  | −2 | 0 |
|  | 0.200 | .2 | −2 | −1 |
|  | 0.400 | .2 | −2 | −2 |
|  | 0.800 | .2 | −2 | −3 |
| L | 1.600 | .2 | −2 | −4 |
|  | 0.160 | .10 | −1 | −4 |
|  | 0.320 | .2 | −1 | −5 |
|  | 0.640 | .2 | −1 | −6 |
| L | 1.280 | .2 | −1 | −7 |
|  | 0.128 | .10 | 0 | −7 |
|  |  | .2 |  |  |
| 0 | 0.256 | .2 |  |  |
| 00 | 0.512 | .2 |  |  |
| 00L | 1.024 | .2 |  |  |
| 00L0 | 0.048 | .2 |  |  |
| 00L00 | 0.096 | .2 |  |  |
| 00L000 | 0.192 | .2 |  |  |
| 00L0000 | 0.384 | .2 |  |  |
| 00L00000 | 0.768 | .2 |  |  |
| 00L00000L | 1.536 | .2 |  |  |
| 00L00000LL | 1.072 | .2 |  |  |

Result: $0.00L00000LL \cdot 2^{-7}$

The number M of positions in the register section B is assumed to be 10 ($10^3 \approx 2^{10}$). For better understanding, the decimal numbers are listed in column D not in tetrad-coded form but in decimal writing. The succession of operations to be effected, multiplications by 2 (.2), divisions by 10 (:10) are listed in column Op. The columns P and Q indicate the condition of the respective counters at the instant considered. At the beginning of the calculation the contents of the binary section B of the register are zero, and the number 0.1 in tetrad-coded form is located in the decimal section D. The contents of the decimal exponent counter P are −2 and those of the binary exponent counter Q are zero. The number of multiplications by 2 is interrupted for the first time when the number 1.6 appears in the decimal register, transferring a L into the binary section B. However, the following division by 10 (shift of four positions toward right) causes this L to go back into the decimal section D. At the end of the first operative stage, when the contents of the counter P are brought to zero, the number 0.128 is found in the decimal section D (of course, in tetrad-coded form) and the number −7 in the binary exponent counter Q. There follows the second operative stage, wherein continuous multiplications by 2 are performed and the overflows which occur are shifted into the binary section B of the register. After $M=10$ steps, the calculation is over; the result is $0.1 \cdot 10^{-2} = 0.00L00000LL \cdot 2^{-7}$.

Conversion of integers or mixed decimal numbers in floating point representation, wherein $|d|<1$ and $p>1$, is performed in a corresponding manner, the decimal mantissa introduced in the decimal section being during the first operative stage continuously divided by 2 (control of R via conductor 2), and multiplied by 10 (control of 4L via conductor 3) each time the first decimal digit disappears, i.e. when a zero appears in the first left-hand tetrad of section D (report to St via conductor 5).

At the beginning of the conversion process, the decimal exponent $p$ is brought again into the decimal exponent counter P. At each division by 2 the number in the binary exponent counter Q is increased by 1 via the conductor 10 and at each multiplication by 10 the number in the counter P is decreased by 1 via the conductor 11. This type of operation will continue until the number 0 appears in the counter P—this being again reported to St via the conductor 7. In the second stage, operations run as in Table 3, the binary mantissa being formed in the left-hand section B of the register from the right-hand end thereof. Counters P and Q are not operating during this second stage. A calculation example in the form of a table needs not be given since this last-mentioned process can easily be understood from the preceding description.

The reverse case, i.e. conversion of a binary number into a decimal number, is performed in two steps in a corresponding manner, the binary exponent counter Q being first brought to zero by continuous multiplication, or division, by 2 and division, or multiplication, by 10 (according to the value of q: <1 or >1) at the same time the decimal exponent being formed in the counter P. There is also provided a further read out conductor 12, which reports the zero in Q to control unit St and thereby changes over to the second operative stage that is performed in reverse succession, as aforementioned, with respect to the conversion of decimal numbers into binary numbers.

In order to achieve an accurate conversion, it can be necessary to have a few more decimal positions (about four) at the right-hand side of the register section D. The number of additional decimal positions required depends on the admissible exponent range. Especially, the left-hand side of the left-hand register section B may be used for this purpose, since during the first part (normalisation) of the conversion process, no digits are located in said section.

According to the specification so far described, the binary mantissa lies in the range $0.1<b<1$ after the conversion process. However, the normalisation $0.5<b<1$ is usual. If it is desired to achieve this usual normalisation small shifts must be performed by means of the counter Q and this, at the end of the conversion process. Such a normalisation with conventional means gives rise to no additional difficulties; if the binary number $b$ is smaller than 0.5, a zero will appear at the most significant position of the register B because the value of this position is equal to ½. This can readily be interrogated via the line 6, shown in FIGURE 3, and the read-out result, i.e., zero, is used to continue to shift the information rightwardly in a stepwise manner until a one appears in the most significant position of the register B. The number of these rightward shifts, each of which, of course, represents a multiplication by 2, must be subtracted in the counter Q. For example: the number 1 can be represented in a binary form as $0.L \cdot 2^3$. A zero will then appear at the most significant position of the register B and a 3 will appear in the counter Q. But the normalized representation should read $0.L \cdot 2^1$, and then a one will appear in the most significant position of the register B as well as in the counter Q. The one in register B is thus rightly displaced by two positions, and at the same time the contents of the counter Q has been reduced by 2.

Beside the aforementioned advantages of relieving the computer and thereby saving time, the arrangements according to the invention have a furhter advantage in that they can be used as decimal indicator devices in a binary computer. For the purpose of testing new programs or the computer itself, the output unit can be coupled to the indicator device without having to interrupt the calculating process itself.

We claim:

1. An arrangement for converting decimal numbers into binary numbers and binary numbers into decimal numbers, comprising, in combination: a two-section shift register made up of binary register elements and having a first section for storing signals representative of a decimal number in a binary-coded form and a second section for storing signals representative of a binary number, at least the most significant register element of said first section being connected to the least significant register element of said second section, means for shifting the signals representative of the number from the first register section into the other through gradual multiplication (shift toward left) and from the second register section into the first by division (shift toward right) by 2; and means connected to the register elements of said first section, including the least significant one of said second section, for testing signals representative of pseudo-decimals and overflows occurring between two shifts by one position and for feeding correction signals to those of said register elements which according to the test result must be changed into their other state.

2. An arrangement according to claim 1 wherein the right-hand section of said shift register receives the coded decimal number and the left-hand section receives the binary number, wherein the right-hand end of the register is coupled to the left-hand end thereof in such a manner that when converting a decimal integer into a binary integer, the latter is formed in the left-hand section by the remainders resulting from gradual division by 2, said remainders leaving the right-hand end of the decimal section and entering the left-hand end of the binary section, and when converting a decimal fraction into a binary fraction the latter is formed in the left-hand section by the overflows resulting from gradual multiplication by 2, said overflows leaving the left-hand end of the decimal section and entering the right-hand end of the binary section.

3. An arrangement according to claim 2 for converting numbers in floating point representation having a mantissa smaller than one, further comprising a counter for the decimal exponent, a counter for the binary exponent, and a control unit which, when converting a decimal number having a decimal exponent $p>1$ or $p<1$ respectively into a binary number, performs gradually divisions or multiplications by 2 respectively, and a multiplication or a division by 10 respectively on the occurrence of a zero within or a carry over from the most significant decimal position respectively, this being done under simultaneous increase or decrease respectively of the contents of the counter for the binary exponent by one unity at every operation by 2 and simultaneous decrease or increase respectively of the contents of the counter for the decimal exponent by one unity at every operation by 10 until a zero appears in said last-mentioned counter thereby initiating an operation according to claim 2.

References Cited in the file of this patent

UNITED STATES PATENTS

| | | |
|---|---|---|
| 2,444,042 | Hartley et al. | June 29, 1948 |
| 2,647,689 | Bowyer et al. | Aug. 4, 1953 |
| 2,860,831 | Hobbs | Nov. 18, 1958 |

OTHER REFERENCES

Mauchly-Conversion Between Binary and Decimal Number Systems, Theory and Techniques for Design of Electronic Digital Computers, University of Pennsylvania (June 1948). Lecture 25 (pages 25—1 to 25—8, pages 25—2 and 25—3 relied upon).